April 12, 1966   TOSHIO IEMURA   3,246,187
FERRITE CORE ROTORS
Filed April 2, 1963
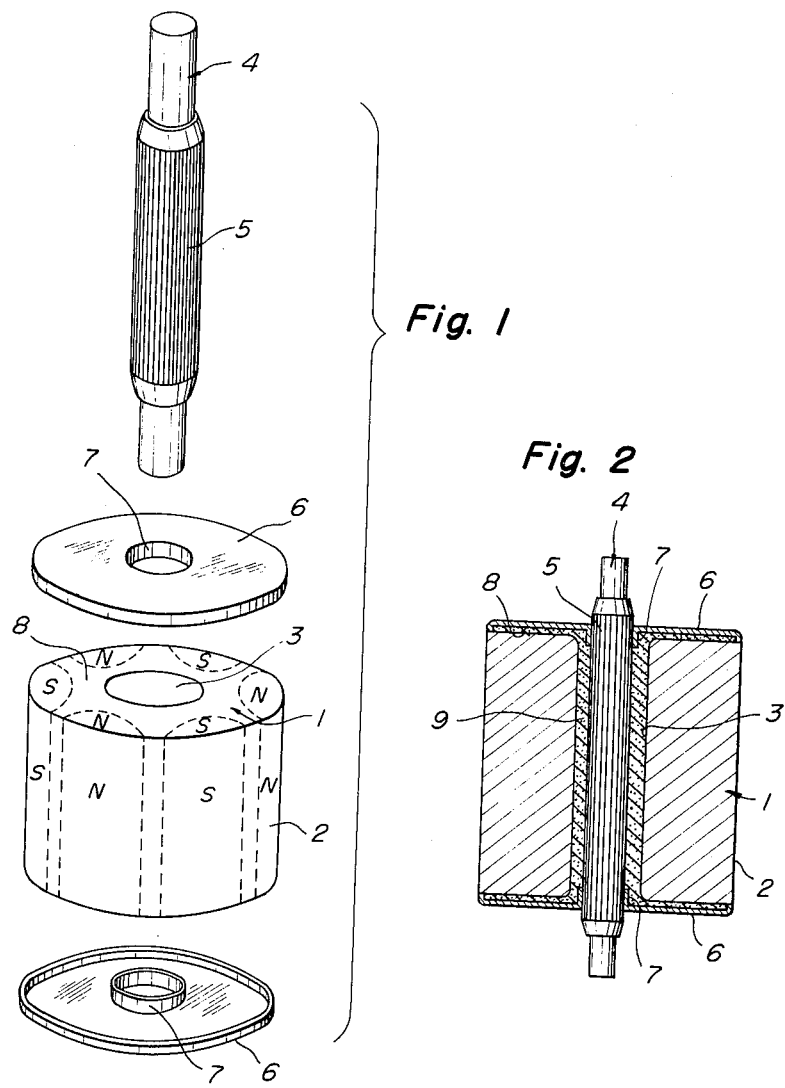
INVENTOR
TOSHIO IEMURA
BY: Darby & Darby
ATTORNEYS

United States Patent Office 3,246,187
Patented Apr. 12, 1966

3,246,187
FERRITE CORE ROTORS
Toshio Iemura, Kyoto, Japan, assignor to Sanyo Electric Co., Ltd., Moriguchi-shi, Japan, a corporation of Japan
Filed Apr. 2, 1963, Ser. No. 269,990
Claims priority, application Japan, Apr. 3, 1962, 37/16,882
2 Claims. (Cl. 310—156)

This invention relates to rotors of electric rotary machines and particularly to those of the type employing a magnetic core of ferrite.

As compared with conventional rotor cores, ferrite cores have various advantages. For example, they exhibit exceedingly high coercivities, are magnetically highly stable even under the effect of external fields, and is less susceptible to the demagnetizing effect of mechanical shocks. On the other hand, ferrite cores are fragile compared with cores of any other core material.

It follows that, where ferrite cores are utilized as a rotor of a generator or other rotary machine, there is a danger that a crack take place in an axial direction under the centrifugal effect when the rotor is driven at high speed, thus making it impossible to give a magnetic effect enough to fully serve the purpose. The present invention is intended to overcome this difficulty and provides an improved ferrite core rotor which comprises a rotor body including a cylindrical ferrite core magnetized about the periphery thereof alternately in opposite polarities and having an axial bore extending therethrough, a rotor shaft extending through said axial bore in said rotor body, and a pair of retainer discs each having a central aperture and fitted over said rotor shaft in face-to-face relation with the adjacent end face of said rotor body, said rotor components being joined together by a single adhesive layer extending between the opposite end faces of said rotor shaft and said respective retainer discs as well as between said rotor body and said rotor shaft.

The foregoing and other objects, features and advantages of this invention will be apparent from the following description when taken in conjunction with the accompanying drawing, in which:

FIG. 1 is an exploded perspective view of a rotor embodying the present invention; and FIG. 2 is a vertical elevation, partly in section, of the rotor assembly.

Referring to the drawing, the rotor embodying the invention includes a rotor body 1, a rotor shaft 4 and a pair of retainer discs 6. The rotor body 1 takes the form of a cylindrical ferrite core which has an axial bore 3 extending therethrough. The ferrite core 1 is magnetized to form magnetic poles circumferentially arranged along the outer periphery thereof alternately in opposite polarities. The rotor shaft 4 is fitted in the axial bore 3 in rotor body 1 and has an enlarged intermediate portion knurled to form axial ridges 5. The retainer discs 6 each have a central aperture 7 to be forcibly fitted over the knurled portion of the motor shaft 4 and thus held on the latter in closely spaced face-to-face relation to the adjacent end face 8 of the rotor body 1. The retainer discs 6 are desirably formed of nonmagnetic material in consideration of the leakage of the magnetic flux from the polarized surface 2 of the rotor body 1. In other words, if the retainer discs be formed of magnetic material, part of the magnetic flux passing from one magnetic pole to another will leak into the retainer discs and the magnetic effect of the rotor will be reduced to that extent.

Reference numeral 9 indicates a continuous layer of an adhesive preferably of epoxy resin such as available under the trade name of "Araldite." In assembling the rotor, the adhesive in liquid state is injected continuously into the space between the rotor shaft 4 and the inner wall of the axial bore 3 of the rotor body in which said shaft is fitted and between each of the retainer discs 6 and the adjacent end face 8 of the body 1 so that the component members are joined together into an integral assembly by a continuous adhesive layer 9.

Because of this integral structure, the rotor has an exceptionally large toughness enough to withstand any stress occurring in the rotor to act in a direction parallel or normal to the axis of the rotor in operation. It has been found that the binding strength of the rotor of this invention is much higher than that of conventional rotors in which the retainers and the rotor body are joined to each other and to the rotor shaft with separate adhesive layers, and is enough to prevent the rotor from being damaged by any mechanical shock. It is to be understood that the forced fitting of the retainer discs over the rotor shaft not only aids in joining the discs to the rotor shaft but is also effective to hold the discs in place on the shaft relative to the respective end faces of the rotor body before the adhesive layer has completely solidified.

The invention is not restricted to the features described above and shown in the drawing but may be varied in many ways within the scope of the appendant claims.

What is claimed is:

1. A ferrite core rotor assembly for a motor comprising:
   a cylindrical core of ferrite material having sections magnetized about the periphery thereof alternately in opposite polarity, said core having an axial bore extending therethrough,
   a rotor shaft extending through said axial bore,
   a retainer disc for each end of said core, each disc being of substantially the same outer diameter as the outer diameter of the core and being formed with a central aperture to fit over said shaft and with means to provide a space between the adjacent end face of the core and the inner face of the disc substantially to the outer edge of the core,
   and a continuous layer of adhesive extending between the rotor shaft and the inner wall of the axial bore of the core and the end faces of the core and adjacent inner faces of the retainer discs to form an integral rotor assembly.

2. A ferrite core rotor assembly for a motor comprising:
   a cylindrical core of ferrite material having sections magnetized about the periphery thereof alternately in opposite polarity, said core having an axial bore extending therethrough,
   a rotor shaft extending through said axial bore,
   a retainer disc for each end of said core of substantially the same outer diameter as the outer diameter of the core, each said disc also having, means surrounding a central aperture to mechanically attach the disc onto said shaft, and
means to provide a space between the adjacent end face of the core and the end face of the disc substantially to the outer edge of the core, and a continuous layer of adhesive extending between the rotor shaft and the inner wall of the axial bore of the core and the end faces of the core and adjacent inner faces of the retainer discs to form an integral rotor assembly.

References Cited by the Examiner

UNITED STATES PATENTS

| | | | |
|---|---|---|---|
| 2,192,985 | 3/1940 | Reis | 310—156 |
| 2,257,824 | 10/1941 | Tognola | 310—156 |
| 2,305,125 | 12/1942 | Wolferz | 310—156 |
| 2,488,729 | 11/1949 | Kooyman. | |
| 2,818,517 | 12/1957 | Loosjes | 310—261 |
| 3,102,966 | 9/1963 | Hansen | 310—261 |

FOREIGN PATENTS

| | | |
|---|---|---|
| 995,191 | 11/1951 | France. |
| 1,166,907 | 11/1958 | France. |
| 1,210,349 | 9/1959 | France. |

ORIS L. RADER, *Primary Examiner.*

MILTON O. HIRSHFIELD, *Examiner.*

J. J. SWARTZ, *Assistant Examiner.*